June 11, 1929.　　A. J. SAWIN　　1,716,837
CLOVER THRASHER
Original Filed Dec. 1, 1926　　4 Sheets-Sheet 1

Fig. 1

Inventor:
Arthur J. Sawin
By Williams, Bradbury, McCaleb & Hinkle
Attys.

June 11, 1929. A. J. SAWIN 1,716,837
CLOVER THRASHER
Original Filed Dec. 1, 1926  4 Sheets-Sheet 2

Inventor
Arthur J. Sawin
By Williams, Bradbury, McCaleb & Hinkle
Attys.

June 11, 1929.  A. J. SAWIN  1,716,837
CLOVER THRASHER
Original Filed Dec. 1, 1926   4 Sheets-Sheet 3

Patented June 11, 1929.

1,716,837

UNITED STATES PATENT OFFICE.

ARTHUR J. SAWIN, OF ANTHON, IOWA.

CLOVER THRASHER.

Original application filed December 1, 1926, Serial No. 151,844. Divided and this application filed September 14, 1927. Serial No. 219,428.

My invention relates to clover thrashers, more particularly to sweet clover attachments adapted to be attached to the delivery end of a binder to thrash the sweet clover from the severed plants, during the operation of the binder to cut the plants.

The present application is a division of my application Serial No. 151,844, filed December 1, 1926, for clover harvesters.

While my invention is particularly adapted to and efficacious in the harvesting of sweet clover, I desire it to be understood it may be used for the harvesting of various other seeds and grains having similar characteristics, and I do not desire to limit the use of my invention for harvesting sweet clover. Furthermore, the various combinations and sub-combinations of the elements of my invention are capable of new and useful results when used separately or in other machines, and I do not limit myself to their use in this particular embodiment.

In the harvesting of sweet clover, it has been customary to cut and tie the sweet clover in bundles, shocking the same in the fields and later conveying the sweet clover to a central point where it is thrashed and the seed separated from the severed plants. Sweet clover is particularly hard to thrash if it is desired to knock the hulls from the seed, and in any event, an intervening rain between the cutting of the clover and the harvesting operation will knock practically all of the seed from the plants upon the ground where it is wasted. Furthermore, the operations of hauling sweet clover bundles and other handling of the same results in a very serious loss of seed, as much of the seed falls out of the bundles on the way to the thrashing machine.

My invention overcomes these and other difficulties in that it is adapted to be substituted for the usual tying mechanism upon the ordinary binder so as to receive the severed plants from the delivery rolls of the binder and thrash the seed therefrom at once, depositing the seed in a receptacle provided therefor and discharging the straw upon the ground.

One of the objects of my invention is the provision of sweet clover attachments for binders capable of receiving the severed plants from the binder and thrashing the seed from the same during the operation of cutting.

Another object of my invention is to provide such an attachment which is compact, simple of construction and operation, durable, efficient, and cheaply manufactured.

Another object of my invention is to provide a thrasher attachment for binders which is light in weight and which may, therefore, be attached to the binder and supported thereby without extra trucks or supporting mechanism.

Another object of my invention is the provision of a harvester attachment for a binder capable of receiving the severed plants from the binder rolls in spread out condition so that the seed may be more easily thrashed without clogging the same.

Another object of my invention is the provision of a sweet clover thrasher which harvests the sweet clover with the hulls on.

Another object of my invention is the provision of a sweet clover thrasher capable of thrashing the clover seed without chopping up the clover plants to any appreciable extent.

Another object of my invention is the provision of novel mechanical elements in a harvester machine, including a self-adjustable, resilient concave, adjustable sieve, straw agitating fingers, toothed cylinder structure, and other elements.

Other objects and advantages of my invention will appear more fully from the following description and the accompanying drawings, in which similar characters of reference indicate similar parts throughout the several views.

Referring to the drawings.

Figure 1:
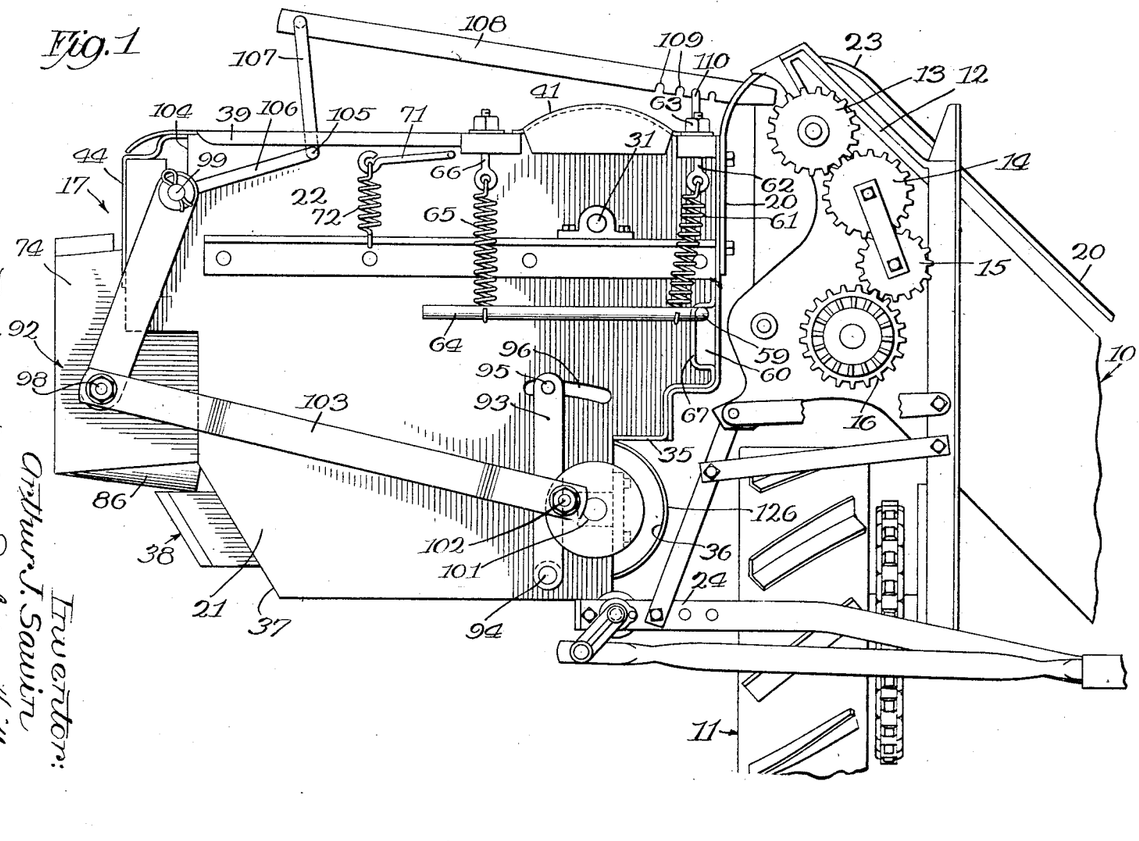
Figure 1 is a vertical elevation of my invention, showing its application to existing binder structures.

Referring to Figure 1, 10 indicates in its entirety the mechanism of the delivery end of an ordinary binder, which may be practically any type of existing binder now on the market, having means for delivering the severed straw from some part of the machine.

11 indicates the driving wheel of the binder, which is adapted by means of various mechanism (not shown) to actuate the cutting, delivery, tying and discharge mechanism of the binder.

12 indicates one of the lateral frame members of the delivery elevator of the binder, while 13, 14, 15, and 16 indicate the various gears necessary to operate the upper and lower elevators of the delivery mechanism, which, however, forms no part of this invention and is merely illustrated to show the connection of my invention with the cooperating parts of the binder.

According to my invention the usual tying mechanism of the binder may be removed from its position in proximity to the delivery elevator, and my harvester, which is indicated in its entirety by the numeral 17, may be substituted therefor in such position as to receive the severed plants from the delivery elevator between the toothed cylinder 18 and the concave 19.

My thrasher may be conveniently attached by means of a plurality of pieces of ordinary strap iron, such as the member 20, one of which is attached to each side of the upper edge of the frame members 21 and 22 of my thrasher, extending up over the curved end of the elevator frame as at 23, and down the edge of said frame to be attached thereto by any convenient means, such as bolts or screws. It will be observed that as my thrasher frame may be made of the same width as the elevator frame, the two frame members 21 and 22 will be spaced a distance practically equal to that of the frame members of the elevator, thereby facilitating easy attachment by the strap iron members 20.

The number 24 indicates existing frame members of the binder, and my clover thrasher is preferably made of such size and depth that it may rest directly upon the two frame members 24. The casing of the harvester may be bolted or otherwise secured to the frame members 24, but this is not necessary and the thrasher may be securely held by means of a few bolts which secure the strap iron members 20 to the elevator. It will thus be observed that my thrasher may be readily attached to the ordinary binder by means of a few bolts.

Referring to Figure 1, 31 indicates a shaft journaled in the side frame members of my thrasher and this shaft may be provided with a bevel gear 32 which is adapted to be actuated from the power take-off of the tractor. I desire it to be understood that the shaft 31 may be actuated by belts and pulleys from the wheels or other mechanism of the binder and any suitable means of power transmission may be supplied. The ratio of the gearing and the number of the revolutions of the power take-off should preferably be such that the shaft 31 will rotate at a speed of from 150 to 300 revolutions per minute.

Figure 2:
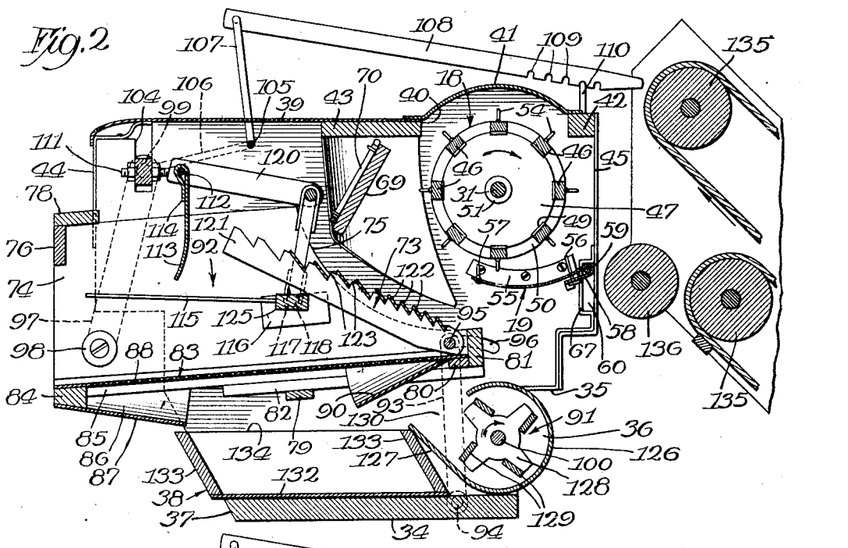
Figure 2 is an elevational cross sectional view, taken in a plane parallel to the side shown in Figure 1.
Figure 3:
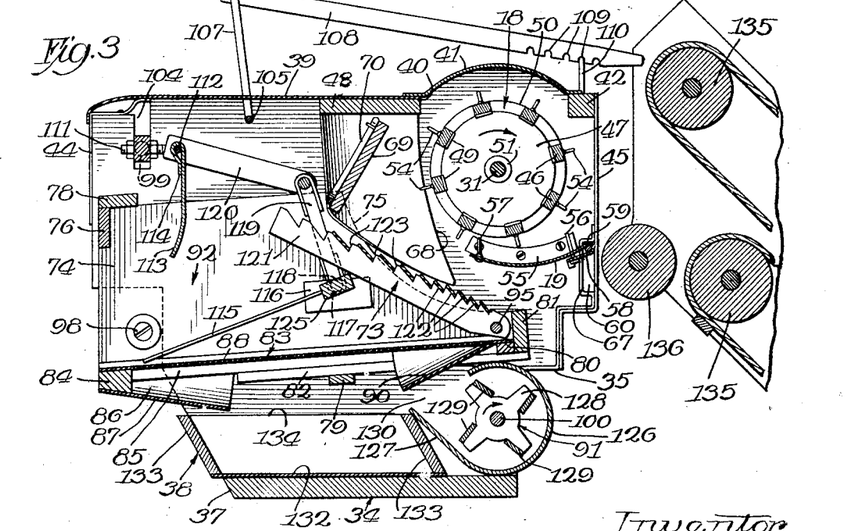
Figure 3 is a view similar to Figure 2, showing the parts in another operative position.
Figure 4:
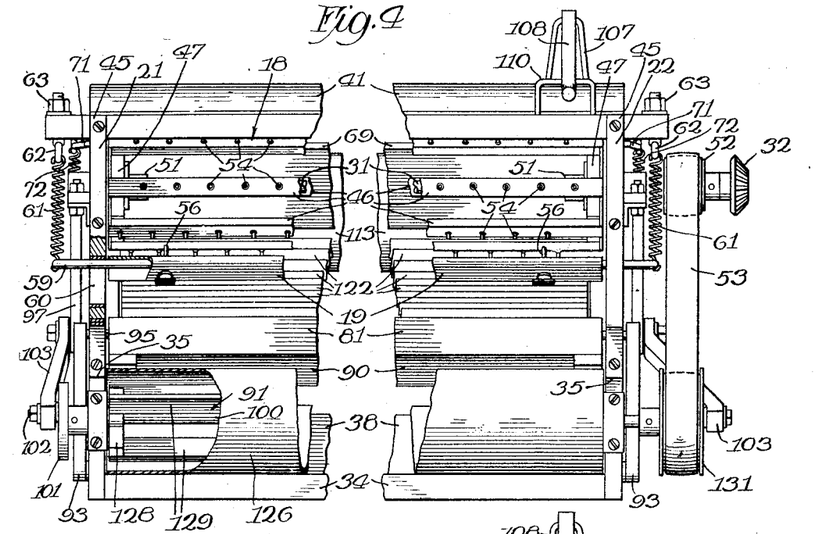
Figure 4 is a front elevational view of the receiving end of my thrasher, partially broken away to show views of structure in other planes.

Referring to Figures 2 and 3, showing a cross section of my thrasher, 34 indicates the floor of my thrasher which may consist of a wooden frame member extending from and secured to the side frame members 21 and 22, forming a box-like structure of irregular shape, the parts of the frame sides 21 and 22 being cut away wherever the frame is not required in order to reduce weight. Thus the side frames 21 and 22 deviate from the rectangular form at 35 below the toothed cylinder 18, at 36 where the frame members 21 and 22 provide a circular portion to form a fan casing, and at 37 below the sieve structure where the side members 21 and 22 are cut down to conform to the size of the required seed box 38.

In order to provide a cover for the box-like structure formed by the side members 21 and 22 and the floor member 34, I provide a sheet metal cover 39, which may be secured on each side to the frame members 21 and 22, respectively, by bolts, screws or any convenient fastening means, said cover extending from the rear end of the thrasher to a point 40 adjacent the toothed cylinder 18, and in order that the toothed cylinder may be more accessible I provide a separate curved sheet metal cover 41, having substantially concentric curvature, with the toothed member 18 and supported by curved portions upon the side frame members 21 and 22, as well as by a brace 42 extending between said frame members at their forward upper edge. It will be understood that the frame members 21 and 22 may also be connected across the top at intermediate points by wooden frame members, such as 43, underneath the cover member 39, and capable of providing chief means of support for maintaining the frame in its proper shape.

The wooden frame members 21 and 22 may also be reinforced by providing their edges with strap iron covering, as at 44, at the rear edge of the frame members, and at 45 at the forward edge of the frame members, where they come in contact with the frame of the binder elevator.

Figure 5:
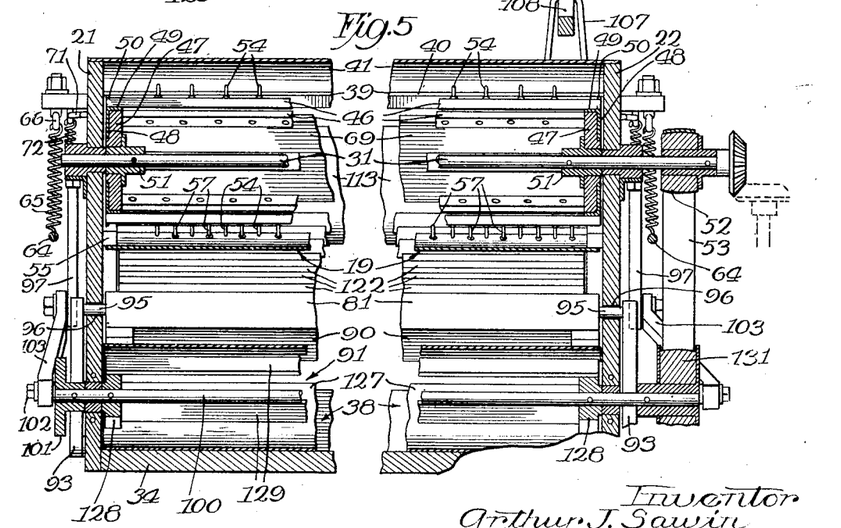
Figure 5 is an elevational view, showing a cross section through the toothed cylinder and fan.

The toothed cylinder 18, which is supported upon the shaft 31 and keyed thereto to move with the gear 32, may consist of a plurality of wooden bars 46 which are supported upon a plurality of circular hubs 47, here shown as made of wood. In order to reinforce the wooden hubs 47, I provide the same with steel plates 48, fixed to one side of the wooden hubs 47, having inwardly turned flanges 49 underneath each of the wooden bars 46, and upwardly extending flanges 50, shown in dotted lines in Figure 5, between each of the wooden bars 46. The wooden bars 46 are provided with a plurality of spiked teeth 54, which may be of any convenient size, but I have found that teeth of about 7/16 of an inch are sufficient in strength for the purpose desired, the length being of the proportion approximately shown in the drawing. The teeth 54 may be equally spaced upon the bars 46, but should preferably be arranged so that the teeth upon separate bars are offset from each other in order to provide a cylinder with teeth set in irregular positions so as to more efficiently take hold of the severed plants at any point throughout the length of the cylinder.

The wooden hubs 47 are secured to the shaft 31 by fastening with bolts or other convenient means to the hub members 51, which are keyed or splined to the shaft 31. At the end of the shaft 31, adjacent to the gear 32, the shaft 31 is provided with a wooden pulley 52, which is keyed thereto in the usual manner to rotate with the shaft 31, actuating the belt 53 to drive other parts of the mechanism, further to be described.

Fixedly supported upon each of the side frame members 21 and 22 is a curved wooden member 55, having its lower edge spaced from the toothed cylinder 18. The curved members 55 are stop members adapted to receive the ends of the concave member 19 and limit its motion upward toward the toothed cylinder 18. The concave 19 consists of a sheet metal member which may be provided with a plurality of spiked teeth 56 and 57, and I have found that it is sufficient to provide a couple of rows of spiked teeth in the concave 19 for the purpose of directing the severed plants against the teeth 54 of the toothed cylinder 18. The teeth 56 and 57 do not project between the teeth 46, but terminate without the extreme circle described by the outer points of the teeth 54, and if desired the teeth 56 and 57 may have a slight backward slant from the direction of movement of the severed plants in order to permit the plants to slide off the teeth 56 and 57 into the path of the teeth 54.

The concave 19 consists of a curved sheet of metal which is bent back upon itself at its forward end as at 58 about a metal rod 59, preferably of steel, and the teeth 56 may be riveted through the flange 58 and the concave 19 in such a manner as to fixedly support and key the concave member 19 upon the rod 59.

Referring to Figure 1, the rod 59 at the forward edge of the concave 19 extends at both ends of the said concave beyond the edges of the frame members 21 and 22 through slots 60 in the frame members 21 and 22, and thereafter the rod 59 is turned backward at right angles along the approximate plane of the concave 19.

At the forward end of the latter portion of the rod 59 there is attached a spring 61 extending upwardly to an eyebolt 62, which is attached to the upper frame member 42. The tension of the spring 61 may be adjusted by means of the nut 63 on the eyebolt 62. At the rearward end 64 of the rod 59, exterior to the thrasher, there is attached a similar spring 65, which is likewise supported from the top of the casing by an eyebolt 66 passing through the frame member 43, and the rod 59 is likewise supported adjacent the opposite side of the concave and frame member 22 by similar springs 61 and 65 in such manner that the concave 19 is resiliently urged by a plurality of springs against the stop members 55 within the casing, and thereby constitutes a self-adjustable concave which is capable of resilient release in case of a clogging of the severed plants, or the presence of a collection of other matter between the concave and the toothed cylinder 18.

A convenient method of providing slots 60 for the rod 59 in the frame members 21 and 22 consists in cutting the frame member away to form a groove 60, lining the grooves with strap iron members 67 and closing the grooves to form slots 60 by means of the strap iron members 45 on the forward edges of the frame members 21 and 22.

Behind the toothed cylinder 18 I provide directing means for the severed plants in the form of sheet metal flanges 68, extending from the top of the casing on each side wall directly behind the toothed cylinder 18 to a point below the concave 19, the flanges 68 being inwardly curved at their lower ends to direct the severed plants upon the straw rack further to be described. I further provide a swinging lid 69, which may consist of a sheet metal plate of the approximate length of the space between the flange plates 68 and which may be supported upon a rod 70, which extends through the frame members 21 and 22 at each side and is bent at right angles to the pivotal axis to form cranks 71. The cranks 71 may have springs 72 attached to their outer ends, the other ends of the springs 72 being attached to the frame members 21 and 22 in any convenient manner so as to provide the lid 69 with resilient means for resisting its pivotal movement. In the case of the congestion of severed plants within the machine, the lid 69 will give upwardly permitting the same to pass through, but under ordinary conditions it will serve to direct the severed plants and seed against the straw rack 73, further to be described.

Within the box-like structure at the rear of the toothed cylinder and resilient lid 69, I provide a second box-like casing, indicated in its entirety by the numeral 92, consisting of two wooden side frames 74, which are substantially rectangular, but are cut away at their forward upper edge as at 75 to a curved conformation so as not to interfere with the resilient lid 69 or the directing flanges 68, but so as to still provide a bottom frame work capable of supporting the straw rack 73. The wall frame members 74 of this inner casing may be joined by a plurality of struts or cross frame members, as the struts 76 and 78 at the rear top corner, the strut 79 across the bottom, and the forward strut 81, thereby providing a box-like member open at the top, the bottom and the front and rear sides, except as closed by the straw rack and sieve further to be described.

The side frame members 74 of the inner casing are each provided at their base with a wooden cleat 82, extending along and above the frame member 79 and having a slight downward slant toward the rear for the purpose of supporting a sieve, which is indicated in its entirety by the numeral 83. The sieve 83 consists of a wooden frame work of substantially rectangular form, having a front frame piece 80, a rear frame piece 84, and a pair of side frame pieces 85, the upper surface of this frame being covered with a perforated piece of sheet metal 88, having apertures equally spaced over its entire surface, the apertures being of sufficient size to freely pass any size of sweet clover seed, but preventing the passage of straw or larger particles. The sieve 83 is likewise provided with a pair of wedge shaped frame members 86 at its rearward end for the purpose of supporting fixedly upon the sieve a rectangular sheet of metal 87, which serves as one side of the hopper, directing the grain falling through the perforated sieve 88 into the grain box 38, further to be described.

The forward end of the sieve is likewise provided with a substantially rectangular piece of sheet metal 90, which is fixed to the forward frame member 80 of the sieve, extending downward after the manner of a hopper to direct the seed into the seed box 89 and also to serve as a baffle for the current of air coming from the fan 91. The sieve 83 may be removed from the frame member 74 by sliding the same outward to the left in Figures 2 or 3 from the position shown upon the cleats 82.

The interior box-like casing 92 is pivotally supported for oscillation within the main harvester casing by means of a plurality of pivoted levers. Referring to Figure 1, the lever 93 is pivoted upon the outside wall member 21 as at 94, and at its upper end a bolt or lug 95 extends through an arcuate slot 96 and is pivoted upon the wall member 74 of the interior casing 92. In a similar manner the other side of the interior casing 92 is supported at its forward end for oscillation by a similar lever 93 pivoted upon the opposite wall member 21. At its rearward end, exterior to the main harvester casing, the interior casing 92 is also provided with a pivoted lever 97, which is pivotally mounted upon the wall 74 of the interior casing 92, as by the bolt 98, and the upper end of the lever 97 is pivotally supported upon the exterior wall 22 of the main harvester casing upon the shaft 99, and the opposite side of the interior casing 92 is likewise supported from the shaft 99 by a similar lever 97 in such manner that the interior casing 92 may be oscillated back and forth upon the pairs of levers 93 and 97 in order to shake the sieve 83 supported in the interior casing.

In order to provide for the actuation of the interior casing member and the sieve, the shaft 100 of the fan, further to be described, may be provided at one end with an eccentric 101, consisting of a pulley keyed to the shaft 100, and having a crank 102 eccentrically mounted thereon. The crank 102 has a connecting rod 103 pivotally mounted thereon, the said connecting rod extending to the bolt 98, where it is pivotally connected to the interior casing 92 in such manner that rotation of the shaft 100 reciprocates the connecting rod 103 and with it the interior casing 92 and the sieve 83.

In using my sweet clover thrasher upon a binder it has been found that when the binder is on the side of a hill the sieve 83 may have no slant, such as is required to actuate the seed over its surface, or the sieve 83 may on a side hill have an excessive slant so that the grain will roll off the end of the sieve. In order to obviate this difficulty I provide for means of adjustment of the slant of the sieve within convenient reach of the driver's hand, comprising the following elements. The shaft 99, which pivotally supports the two links 97, which in their turn support the interior casing 92, is mounted upon the exterior frame members 21 and 22 in a pair of slots 104 in such manner that the shaft 99 may be lifted at both ends thereby raising the interior casing 92 and changing the slant of the sieve 83. At the same time the interior casing 92 is still capable of oscillation upon the links 93 and 97, and this adjustment may be made during the operation of the machine as well as when it is standing still.

In order to raise the shaft 99 when desired, I provide a rod 105 which may extend across the full width of the thrasher, being pivoted in the top of the side members 21 and 22, and the rod 105 may be provided at each end with a crank member 106, pivotally connected with the shaft 99 as shown. At an intermediate point the rod 105 may be upwardly bent to form an actuating crank 107, to which may be pivotally connected a pull rod 108, having a plurality of notches 109. In order to support the pull rod 108 in adjusted position, the upper frame member 42 of the exterior casing may be provided with a U shaped stirrup 110, which is fixed thereon by bolts or any convenient means in such manner that the pull rod 108 may be hooked upon the stirrup 110 in any of a plurality of adjusted positions by means of the notches 109. The end of the pull rod 108 is in convenient reach of the driver and when desired or when the binder is operating on the side of a hill, the operator may pull the rod 108 and hook in one of the notches 109 upon the stirrup 110, thereby turning the crank 107 on the rod 105, actuating crank 106 and lifting the shaft 99 at both ends in the slots 104. This raises the pivotal points of support of links 97, thereby altering the height of the rear end of the interior casing 92, and hence regulating the slant of the sieve.

Supported upon the shaft 99, within the interior casing 92, is the rod 111 of substantially U shape, the yoke 112 of the U extending across the width of the interior casing 92, and the ends of the U being fixedly supported upon the shaft 99. The U shaped member 111 supports upon its yoke 112 a loosely pivoted sheet metal lid 113 formed of a substantially rectangular sheet of metal of a length slightly less than the width of the interior casing 92, and having a pivot formed by a flange 114 bent about the yoke 112. The lid 113 extends downwardly behind the straw rack 73 and serves to direct the straw upon the straw fingers 115, further to be described.

Figure 6:
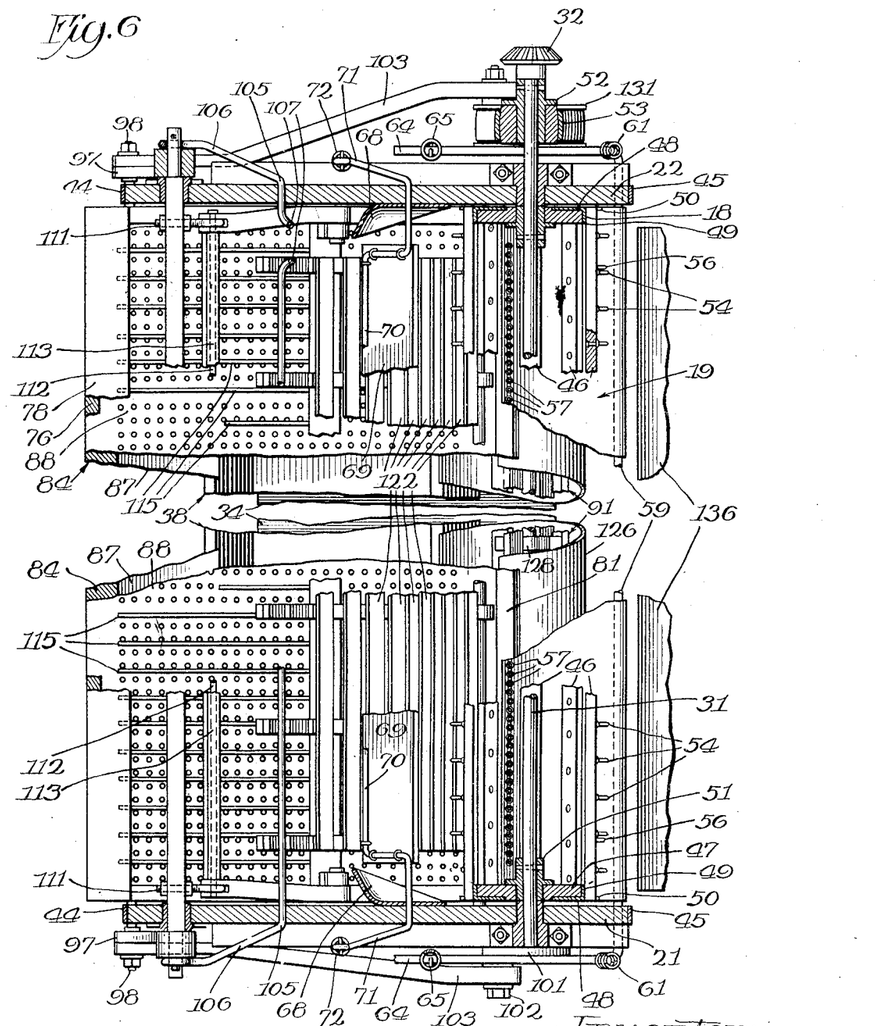
Figure 6 is a plan view of my thrasher with the top removed, broken away in a plurality of places to show the structure in other planes than that visible from the top.

Fixedly supported upon each of the walls 74 is a journal member 116 provided with a notch 117 for the purpose of pivotally supporting a shaft 118 which actuates the straw fingers 115. The shaft 118 has extending from it in a rearward direction a plurality of thin metal rods 115, as shown in Figure 6, somewhat after the manner of a pitch fork having prongs of greater length and number. In the finished machine the straw fingers are about two feet in length, but the length of these elements may be varied depending upon the length of the sieve above which they are situated.

The shaft is keyed to a pair of crank arms 119, one at each side, and the upper ends of the crank arms 119 are each connected by a link 120 to the fixed shaft 112, which also supports the lid 113. The shaft 118 being moved forward and back by its journals 117 which are fixedly supported upon the oscillating interior casing 74, such movement results in lifting the straw fingers 115 up and down from the position shown in Figure 2 to that shown in Figure 3 and back, corresponding to the oscillating motion of the interior casing. The straw fingers 115 are, therefore, adapted to receive the straw from the straw rack 73 and shake it up and down above the sieve 83 to aid in removing the seed therefrom. The straw rack, indicated in its entirety by the numeral 73, consists of a pair of side frame members 121 having an upper edge of approximately saw tooth shape, the length of the teeth increasing toward the rear end of the straw rack. The forward sides of the teeth, which are the sides having the least slant, are covered by a series of pieces of sheet metal 122 of a length slightly less than the width of the interior casing 92, in such manner that the straw rack consists of a series of successively offset plane surfaces 122, having holes between said surfaces as at 123 to permit the dropping through of the seed, and the upper edges of the plates 122 may serve as teeth advancing the straw to the rear with each oscillation, but permitting the straw to slide over the same when the interior structure 92 oscillates to the forward position.

The straw rack 73 is pivotally supported at its forward and lower end upon the shaft 95, which is loosely pivoted in the opposite sides 74 of the interior casing 92, and the rear end of the straw rack 73 rests upon the shaft 118, which supports the straw fingers 115. In order to give the straw rack 73 a slight upward movement, the portion of the shaft 118 which supports the straw rack may be made square or otherwise depart from the cylindrical shape, as shown at 125, resulting in a slight alteration of the height of the rear end of the straw rack during oscillation of the interior casing 92.

The fan 91 consists of an exterior circular casing 126 formed upon circular portions of the walls 21 and 22 of the harvester casing, and extending inward and upward as at 127 to a point above the seed box 89. The ends of the fan casing 126 may be left open for the entrance of air, and the shaft 100 may support a plurality of spiders 128 having a plurality of wooden or metal cross members 129, which by their rotation serve to force a current of air out of the orifice 130. The shaft 100 is driven by a wooden pulley 131 and by a belt 53 extending from the pulley 52 upon the shaft 31 of the toothed cylinder 18. It will be observed that my fan runs at a much slower speed than the fans usually employed in thrashers being attached to the same shaft that operates the oscillating sieve, because the use of a high speed fan such as is usually employed in thrashers would result in the blowing of the seed off the sieve 83.

Supported upon the floor 34 of the harvester casing is a seed box 38, consisting of a sheet metal bottom 132, front and rear frame members 133, and side frame members 134. In order to utilize all the space underneath the fan and to reduce excessive weight for the same amount of space, I have made my seed box 89 of trapezoidal cross section as shown in Figures 2 and 3, the wall 133 conforming to the exterior shape of the bottom of the frame members 21 and 22 of the harvester. The seed box 38 may be removed for emptying whenever desired by sliding outwardly from its position upon the floor 34 and between the walls 21 and 22, thereby keeping down excessive weight on the thrasher.

If desired, an appropriate means of support may be provided for sacks instead of the seed box 38 so that the members 87 and 90 may direct the seed into sacks or bags carried by the frame work.

The operation of my invention is as follows:

My thrasher being built preferably of the same width as the length of the elevator rolls 135 and the deck roll 136, it is adapted to receive the severed plants in a spread out condition from the canvas of the upper and lower elevators. This facilitates the knocking out of the seed from the plants with less possibility of clogging the machine because the severed plants are received in spread out condition with less volume of plants for a unit of area of the toothed cylinder.

The toothed cylinder rotates clockwise, as shown in Figures 2 and 3, the teeth 54 seizing the severed plants fed over the deck roll 135 and by impact loosening the seed from the plants. I find that the resilient concave 19 is very efficacious in assisting this operation, directing the severed plants into the teeth 54, and in the case of a congestion of material the concave automatically adjusts itself to permit the passage of such excess material.

The rotating toothed cylinder 18 feeds the straw and loosened seed upon the straw rack 73, the plants being directed upon the straw rack by the metal flanges 68 and the resilient lid 69. The interior casing 74 is oscillated forward and back by the mechanical connections already described, carrying with it the sieve 83, straw fingers 115 and straw rack 73. The straw rack 73 receives the severed plants and loosened seed and serves to actuate the plants upward and backward over the end of the straw rack, the seed being permitted to fall through the openings 123 upon the sieve 83. The straw falls from the straw rack 73 upon the straw fingers 115, which shake the straw up and down removing the last vestige of a seed therefrom, and also serving to impel the straw outward from the rear end of the oscillating casing 74 where it is discharged upon the ground. The straw thus discharged is not chopped up or otherwise greatly damaged and may be used as fodder if desired, or for any other purposes.

The seed falling from the straw rack 73 and from the straw fingers 115 upon the sieve 83 falls through the apertures in the said sieve into the seed box 89, the seed from the forward end of the sieve and that from the rearward end of the sieve being directed into the seed box by the hopper members 87 and 90, and the low pressure current of air provided by the fan 91 serves to blow the dust out of the seed and through the sieve, thereby cleaning the seed as well as thrashing it. The seed as thrashed by my invention has its hull on, but I find that as it is the general practice to scarify such seed before sowing, the seed having hulls presents no serious disadvantage.

Although I have illustrated an embodiment of my thrasher showing various refinements, such as a fan, a straw rack and straw fingers, I desire it to be understood that my thrasher will thrash sweet clover without the use of these devices and that the toothed cylinder 18 rotating as I have described it, with or without the concave 19, and having a sieve to separate the seed, provides an efficient form of a sweet clover thrasher which is capable of producing new and useful results over the harvesters of the prior art. I, therefore, do not wish to be limited to a machine comprising all of the refining elements described, but desire it to be understood that certain of these elements may be omitted without rendering my thrasher inoperative to produce the results described. By supporting the sieve, straw rack and straw fingers all upon the same hangers, a great deal of excessive weight is eliminated.

It will thus be observed that I have invented a clover seed thrasher which may be attached directly to the frame work of a binder so that the seed may be thrashed while the binder is operated. The specific structure of my thrasher is a very important feature of my invention because it is necessary to have a light and simple structure which will efficiently perform the thrashing operation but which may also be light enough to be carried upon the binder. The provision of a thrasher which rests directly upon the existing frame work of the binder provides a very simple and firm method of support requiring but a few bolts and giving considerable depth to the thrasher through which the grain may fall during the harvesting operation.

While I have illustrated and described a specific form of one embodiment of my invention, this is capable of many modifications without departing from the spirit of the invention, and I do not wish to be limited to the precise details of the construction set forth but desire to avail myself of all advantages within the scope of the appended claims.

Having thus described my invention, what I claim as new and desire to secure by Letters Patent of the United States is:

1. In a clover thrasher, the combination of a casing, with a frame oscillatably mounted therein, links pivotally connecting said casing and frame, a shaft mounted in said frame, a straw rack pivotally mounted on said shaft, a bell crank pivotally mounted in said frame, one arm of said crank supporting said rack, and the other arm of said crank being connected to said casing to oscillate said rack on said shaft as said frame oscillates, and straw fingers carried by said bell crank.

2. In a clover thrasher, the combination of a casing, with a frame oscillatably mounted therein, links pivotally connecting said casing and frame, a shaft mounted in said frame, a straw rack pivotally mounted on said shaft, a bell crank pivotally mounted in said frame, one arm of said crank supporting said rack, and the other arm of said crank being connected to said casing to oscillate said rack on said shaft as said frame oscillates, straw fingers carried by said bell crank, and a sieve carried by said frame below said rack and fingers.

3. In a clover thrasher, the combination of a casing, with a frame oscillatably mounted therein, links pivotally connecting said casing and frame, a shaft mounted in said frame, a straw rack pivotally mounted on said shaft, a bell crank pivotally mounted in said frame, one arm of said crank supporting said rack, and the other arm of said crank being connected to said casing to oscillate said rack on said shaft as said frame oscillates, straw fingers carried by said bell crank, a sieve carried by said frame below said rack and fingers, seed collecting means carried by said casing, and baffles carried below said sieve.

In witness whereof, I hereunto subscribe my name this 26 day of August, 1927.

ARTHUR J. SAWIN.